(12) United States Patent
Sakurai et al.

(10) Patent No.: US 10,074,480 B2
(45) Date of Patent: *Sep. 11, 2018

(54) DIELECTRIC CERAMIC COMPOSITION AND MULTILAYER CERAMIC CAPACITOR

(71) Applicant: TDK CORPORATION, Tokyo (JP)

(72) Inventors: Dan Sakurai, Tokyo (JP); Nobuto Morigasaki, Tokyo (JP); Tatsuya Ishii, Tokyo (JP); Takuma Ariizumi, Tokyo (JP); Shinsuke Hashimoto, Tokyo (JP); Yasuhiro Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,224

(22) Filed: Mar. 22, 2017

(65) Prior Publication Data

US 2017/0287635 A1    Oct. 5, 2017

(30) Foreign Application Priority Data

Mar. 30, 2016    (JP) .................................. 2016-068768

(51) Int. Cl.
*C04B 35/49* (2006.01)
*H01G 4/12* (2006.01)
(Continued)

(52) U.S. Cl.
CPC ........... *H01G 4/1245* (2013.01); *C04B 35/49* (2013.01); *C04B 35/6261* (2013.01); *C04B 35/6303* (2013.01); *C04B 35/64* (2013.01); *H01G 4/012* (2013.01); *H01G 4/248* (2013.01); *H01G 4/30* (2013.01); *C04B 2235/3206* (2013.01); *C04B 2235/3208* (2013.01); *C04B 2235/3213* (2013.01); *C04B 2235/3215* (2013.01);
(Continued)

(58) Field of Classification Search
CPC .............................. C04B 35/49; H01G 4/1245
See application file for complete search history.

(56) References Cited

U.S. PATENT DOCUMENTS 7,397,649 B2 *   7/2008   Muto .................. C04B 35/4682
                                                                   361/321.4

FOREIGN PATENT DOCUMENTS

JP        2004189588 A  *  7/2004
JP        2011-256091 A     12/2011

* cited by examiner

*Primary Examiner* — Karl E Group
(74) *Attorney, Agent, or Firm* — Oliff PLC (57) ABSTRACT

A dielectric ceramic composition having good characteristic even under high electric field intensity, and particularly good IR characteristic and high temperature accelerated lifetime. The present invention is a dielectric ceramic composition comprising,
a main component comprising a perovskite type compound shown by a compositional formula $(Ba_{1-x-y}Sr_xCa_y)_m(Ti_{1-z}Zr_z)O_3$,
a first sub component comprising oxides of a rare earth element,
a second sub component as a sintering agent, wherein
said dielectric ceramic composition is a complete solid solution particle wherein the rare earth element is solid dissolved to entire dielectric particle, or a core-shell particle having high ratio of the diffusion phase, and comprises the dielectric particle having 5 to 20 atom % of the average concentration of the rare earth element in the diffusion phase, and having uniform concentration distribution of the rare earth element in the diffusion phase.

8 Claims, 4 Drawing Sheets (51) Int. Cl.
*C04B 35/626* (2006.01)
*C04B 35/63* (2006.01)
*C04B 35/64* (2006.01)
*H01G 4/012* (2006.01)
*H01G 4/248* (2006.01)
*H01G 4/30* (2006.01)

(52) U.S. Cl.
CPC .............. *C04B 2235/3224* (2013.01); *C04B 2235/3225* (2013.01); *C04B 2235/3236* (2013.01); *C04B 2235/3249* (2013.01); *C04B 2235/6562* (2013.01); *C04B 2235/6567* (2013.01); *C04B 2235/768* (2013.01); *C04B 2235/96* (2013.01)

DIELECTRIC CERAMIC COMPOSITION AND MULTILAYER CERAMIC CAPACITOR

BACKGROUND OF THE INVENTION

1. Field of the Invention

The present invention relates to a dielectric ceramic composition, a multilayer ceramic capacitor including a dielectric layer comprising the dielectric ceramic composition, and particularly the present invention relates to the dielectric ceramic composition having good IR characteristic and a high temperature accelerated lifetime.

2. Description of the Related Art

Recently, as the electronic circuit has become highly densified, the electronic component is demanded to be more compact, and the multilayer ceramic capacitor has rapidly become more compact with larger capacity, further the purpose of use has become wider, thus various characteristics are in demand.

For example, the mid-high voltage capacitor which is used at a high rated voltage (for example 100 V or higher) is suitably used for ECM (engine electric computer module), a fuel injection device, an electric controlled throttle, an inverter, a convertor, HID headlamp unit, a battery control unit for a hybrid engine, a digital steel camera or so.

In case of using it at a high rated voltage as mentioned in the above, it is used under high electric field intensity, but if the electric field intensity becomes higher, the specific permittivity and the insulation resistance or so decreases, hence as a result, the effective capacity or the reliability under the used environment may decrease.

For example, the patent document 1 discloses the multilayer ceramic capacitor comprising a dielectric layer comprising the dielectric particle having a core-shell structure. This dielectric particle comprises a concentration gradient of a sub component at a shell part, and the maximum value of the sub component concentration is found near the particle boundary, and near the boundary between the shell part and the core part. The multilayer ceramic capacitor using this dielectric particle has good a capacity-temperature characteristic and lifetime characteristic.

However, the multilayer ceramic capacitor described in the patent document 1 exhibited insufficient characteristic under high electric field intensity such as when applying DC voltage or so, and thus further improvement of the characteristics were demanded.

PRIOR ART DOCUMENT

Patent document 1: JP Patent Application Laid Open No. 2011-256091

SUMMARY OF THE INVENTION

The present invention is attained in view of such circumstances, and the object is to provide the dielectric ceramic composition having good characteristics even under the high electric field intensity, and particularly good IR characteristic and high temperature accelerated lifetime. Also, the object of the present invention is to provide the multilayer ceramic capacitor comprising the dielectric layer comprising said dielectric ceramic composition.

Means for Attaining the Object

In order to attain the above mentioned object, the dielectric ceramic composition according to the first embodiment of the present invention comprises, a main component comprising a perovskite type compound shown by a compositional formula $(Ba_{1-x-y}Sr_xCa_y)_m(Ti_{1-z}Zr_z)O_3$ (note that, said "m", "x", "y" and "z" all show a mol ratio, and each satisfies $0.94 \leq m \leq 1.1$, $0 \leq x \leq 1.0$, $0 \leq y \leq 1.0$, $0 \leq (x+y) \leq 1.0$, $0.06 \leq z < 0.2$), a first sub component comprising oxides of a rare earth element R (note that, R is at least one selected from the group consisting of Sc, Y, La, Ce, Pr, Nd, Pm, Sm, Eu, Gd, Tb, Dy, Ho, Er, Tm, Yb and Lu), a second sub component as a sintering agent, wherein said dielectric ceramic composition comprises a dielectric particle and a particle boundary, said dielectric particle comprises a complete solid solution particle wherein the rare earth element R is solid dissolved to entire dielectric particle, when a concentration of Ti atom in said complete solid solution particle is 100 atom %, then an average concentration Ra of the rare earth element R in said complete solid solution particle is 5 to 20 atom %, when the rare earth element concentration (atom %) is measured at a part excluding an area 20 nm or less from the particle boundary of said complete solid solution particle, then a standard deviation and an average value of a measured values satisfies (standard deviation/average value) ≤0.25.

In the first embodiment preferably, said (standard deviation/average value) satisfies (standard deviation/average value)≤0.10.

The dielectric ceramic composition according to the second embodiment of the present invention comprises, a main component comprising a perovskite type compound shown by a compositional formula $(Ba_{1-x-y}Sr_xCa_y)_m(Ti_{1-z}Zr_z)O_3$ (note that, said "m", "x", "y", and "z" all show a mol ratio, and each satisfies $0.94 \leq m \leq 1.1$, $0 \leq x \leq 1.0$, $0 \leq y \leq 1.0$, $0 \leq (x+y) \leq 1.0$, $0.06 \leq z < 0.2$), a first sub component comprising oxides of a rare earth element R (note that, R is at least one selected from the group consisting of Sc, Y, La, Ce, Pr, Nd, Pm, Sm, Eu, Gd, Tb, Dy, Ho, Er, Tm, Yb and Lu), a second sub component as a sintering agent, wherein said dielectric ceramic composition comprises a dielectric particle and a particle boundary, said dielectric particles comprises a main component phase made of said main component, and a diffusion phase wherein said first sub component is diffused in said main component, a ratio of area occupied by said diffusion phase is 95% or more and less than 100% in average with respect to a total area of said main component phase and said diffusion phase, when a concentration of Ti atom in said diffusion phase is 100 atom %, then an average concentration Ra of the rare earth element R in the diffusion phase is 5 to 20 atom %, when the rare earth element concentration (atom %) is measured at a part excluding an area 20 nm or less from the particle boundary of said complete solid solution particle and at the diffusion phase excluding the area 20 nm or less from the boundary between the main component phase and the diffusion phase, then a standard deviation and an average value of a measured values satisfies (standard deviation/average value)≤0.25.

In the second embodiment preferably, said (standard deviation/average value) satisfies (standard deviation/average value)≤0.10.

Also, in the second embodiment preferably, the ratio of area occupied by said diffusion phase is 98% or more and less than 100% in average with respect to the total area of said main component phase and said diffusion phase.

As the electronic component according to the present invention, it is not particularly limited as long as it includes the above mentioned dielectric ceramic composition, and for example a multilayer ceramic capacitor, a piezoelectric element, a chip inductor, a chip varistor, a chip thermistor, a chip resistor, and other surface mounting (SMD) chip type electronic component or so may be mentioned. The multilayer ceramic capacitor comprises the dielectric layer including the dielectric ceramic composition of the present invention, and the internal electrode layer.

Effects of the Invention

According to the present invention, by setting the content of each component within the above range, and by setting the concentration of the rare earth element and the diffusion condition within the above mentioned range, the dielectric ceramic composition having particularly good IR characteristic and high temperature accelerated lifetime can be obtained. By having the complete solid solution particle wherein the rare earth element is uniformly diffused in the main component, and by having the core-shell particle wherein the rare earth element is uniformly diffused in the main component of the diffusion phase, the basic characteristics such as the specific permittivity can be maintained good, and also the IR characteristic and the high temperature accelerated lifetime can be improved.

DESCRIPTION OF THE PREFERRED EMBODIMENTS

Hereinafter, the present invention will be described based on the embodiment as shown in the figure.

Multilayer Ceramic Capacitor 1

Figure 1:
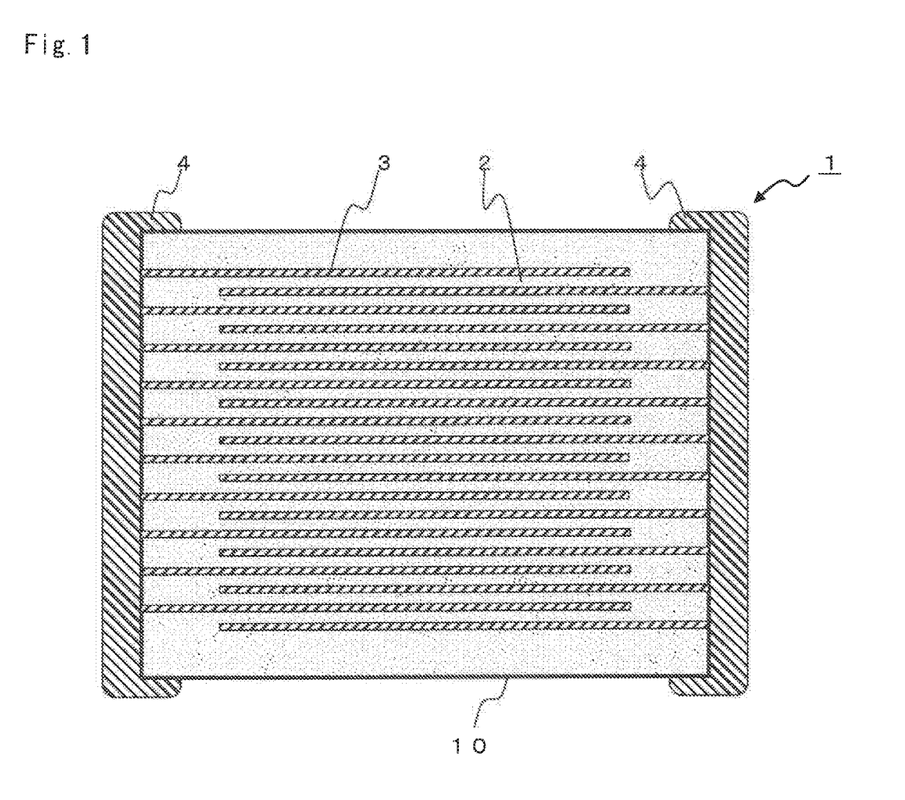
FIG. 1 is the cross section of the multilayer ceramic capacitor according to the first embodiment of the present invention.

As shown in FIG. 1, the multilayer ceramic capacitor 1 as one non-limiting example of the ceramic electronic component comprises the capacitor element main body 10 wherein the dielectric layer 2 and the internal electrode layer 3 are stacked in alternating manner. The internal electrode layer 3 is stacked so that each ends faces thereof expose alternatingly to the surface of the two end parts opposing in the capacitor element main body 10. Pair of the external electrodes 4 are formed at the both end parts of the capacitor element main body 10, and are connected to the exposed end face of the internal electrode layer 3 placed alternatingly, thereby the capacitor circuit is formed.

The shape of the capacitor element body 10 is not particularly limited, however as shown in FIG. 1, usually it is rectangular parallelepiped shape. Also, the size thereof is not particularly limited, and the size may be determined appropriately depending on the purpose of use.

Dielectric Layer 2

The thickness of the dielectric layer 2 is not particularly limited, but it is preferably 0.5 to 20 μm or so per one layer.

The stacked number of the dielectric layer 2 is not particularly limited, but preferably it is 20 or more, more preferably 50 or more, and particularly preferably 100 or more. The upper limit of the stacking number is not particularly limited, and for example it is 2000 or so.

The dielectric layer 2 is constituted from the dielectric ceramic composition according to the present embodiment. The dielectric ceramic composition includes barium titanate based composite oxide of perovskite type ($ABO_3$) as a main component, and the first and second sub components which will be described in below, and also other sub components if needed.

In below, the first embodiment and the second embodiment will be described respectively.

First Embodiment

The main component of the dielectric ceramic composition according to the first embodiment is a perovskite type compound which is expressed by a compositional formula of $(Ba_{1-x-y}Sr_xCa_y)_m(Ti_{1-z}Zr_z)O_3$. Here, "m", "x", "y" and "z" all show mol ratio.

In the compositional formula, "m" shows A/B ratio, and it is $0.94 \leq m \leq 1.1$, and preferably $0.95 \leq m < 0.99$. Also, in other preferable embodiment, "m" may be $0.94 \leq m \leq 0.95$, and also it may be $0.99 \leq m \leq 1.1$. If the value "m" of the main component is too small, IR characteristic becomes low due to the over sintering (abnormal crystal growth), and if the value "m" is too large, then the high temperature accelerated lifetime may decline.

In the compositional formula, "x" shows the ratio of Sr in A site, and it is $0 \leq x \leq 1.0$, preferably $0 \leq x \leq 0.2$, more preferably $0 \leq x \leq 0.1$, further preferably $0 \leq x \leq 0.03$, and it may be 0.

In the compositional formula, "y" shows the ratio of Ca in A site, and it is $0 \leq y \leq 0.03$, preferably $0 \leq y \leq 0.2$, more preferably $0 \leq y \leq 0.1$, further preferably $0 \leq y \leq 0.01$, and it may be 0.

Also, (x+y) is $0 \leq (x+y) \leq 1.0$, preferably $0 \leq (x+y) \leq 0.4$, more preferably $0 \leq (x+y) \leq 0.2$, further preferably $0 \leq (x+y) \leq 0.03$, and it may be 0.

In the compositional formula, "z" shows the ratio of Zr in B site, and it is preferably $0.06 \leq z < 0.2$, and preferably $0.1 \leq z \leq 0.15$. Also, in other preferable embodiment, "z" may be $0.06 \leq z \leq 0.1$, and it may be $0.15 \leq z < 0.2$. By substituting B site with Zr, the bandgap becomes higher, and the resistance can be increased. On the other hand, if Zr is too much, the rare earth element which is the first sub component is interfered from solid dissolving to the main component, and tends to decrease the high temperature accelerated lifetime.

The dielectric ceramic composition comprises the oxides of the rare earth element R as the first sub component. Here, the rare earth element is at least one selected from the group consisting of Sc, Y, La, Ce, Pr, Nd, Pm, Sm, Eu, Gd, Tb, Dy, Ho, Er, Tm, Yb and Lu. Preferably, it is at least one selected from the group consisting of Eu, Gd, and Tb. Note that, two or more of the oxides of the rare earth element can be used together.

The oxides of the rare earth element R is used in the ratio of 10 to 30 mol and preferably 12 to 22 mol with respect to 100 mol of said main component. Also, as other preferable embodiment, it may be 10 to 12 mol, and it may be 22 to 30 mol as well. Note that, the oxides of the rare earth element is usually shown as $R_2O_3$, but the ratio in terms of oxides in the present embodiment is shown as the mol number based on $RO_{3/2}$. Although it is not to be theoretically limited in any way, a part of the rare earth element R is substituted at A site, and act as the donor which releases electron. The released electron captures the oxygen defect, thus the movement of the oxygen defect during the high temperature accelerated lifetime test is suppressed, and it is thought to enhance the high temperature accelerated lifetime. If the content of the first sub component is too little, the movement of the oxygen defect cannot be suppressed, thus the high temperature accelerated lifetime may decrease. If the first sub component is too much, the IR characteristic may decrease.

The dielectric ceramic composition further includes the sintering agent as the second sub component. The sintering agent is not particularly limited as long as it contributes to the sintering of the above mentioned main component and the first sub component, however usually the oxides of Si, Li, Al, Ge and B are preferably used. The contents of the sintering agent in terms of $SiO_2$, $LiO_{1/2}$, $AlO_{3/2}$, $GeO_2$, or $BO_{3/2}$ are preferably 2.5 mol or more, more preferably 2.5 to 3.9 mol or more, and particularly preferably 3 to 3.3 mol, with respect to 100 mol of the main component. By having the content of the second sub component within this range, the insulation resistance and the high temperature accelerated lifetime tends to increase. If the content of the sintering agent is too much, the high temperature accelerated lifetime tends to deteriorate. On the other hand, if too little, the sintering property tends to decline.

As the second sub component, the oxides of Si are preferably used, because it has great effect to improve the characteristics among the above mentioned oxides. As the oxides including Si, it is not particularly limited, and it may be in a form of $SiO_2$ alone, or it may be in a form of composite oxides between Si and other elements such as alkali metal and alkaline earth metal. In the present embodiment, as the oxides including Si, $SiO_2$ is preferable.

The dielectric ceramic composition of the present invention may comprise other sub components besides the above mentioned. As the preferable sub components, oxides of Mg as the third sub component, oxides of at least one element M selected from the group consisting of Mn, Cr, Co and Fe as the fourth sub component may be mentioned.

The third sub component is preferably used in the ratio of 0 to 15 mol, more preferably 4 to 8 mol, and further preferably 4.5 to 6 mol in terms of oxides (MgO) with respect to 100 mol of said main component. Also, in other preferable embodiment, it may be 4 to 4.5 mol, and 6 to 8 mol as well. By having the content of the third sub component within the above mentioned range, IR characteristic and the high temperature accelerated lifetime tend to improve in good balance.

The dielectric ceramic composition may include oxides of at least one element M selected from the group consisting of Mn, Cr, Co and Fe; and preferably it includes MnO, CrO, and particularly preferably it includes MnO as the fourth sub component. Note that, two or more of the oxides of Mn, Cr, Co and Fe may be used together. The ratio of the fourth sub component is 0 to 2.0 mol, and preferably 0.6 to 2.0 mol, more preferably 1.1 to 1.5 mol in terms of oxides (MO), with respect to 100 mol of said main component. Also, in the other preferable embodiment, it may be 0.6 to 1.1 mol, and it may also be 1.5 to 2.0 mol. If the content of the fourth sub component is within the above mentioned range, IR characteristic tends to improve. Note that, the ratio of the fourth sub component in terms of oxides shows the mol number based on MnO, CrO, CoO and FeO.

Although it is not to be theoretically limited in any way, part of the metal elements included in the third and fourth sub components act as the acceptor which substitutes at B site and receives electron, and it is thought to contribute to the improvement of IR characteristic.

By setting the composition of the main component and the content of the sub components within the above mentioned range, the dielectric ceramic composition having particularly good IR characteristic and the high temperature accelerated lifetime can be easily obtained. Particularly, by setting the composition of the main component and the content of the sub components within the specific range, the basic characteristic such as the specific permittivity or so can be maintained good, and even more IR characteristic and the high temperature accelerated lifetime can be easily improved.

The dielectric ceramic composition according to the present embodiment may further comprise other components depending of the desired characteristic. The composition of the dielectric ceramic composition can be verified by Inductively Coupled Plasma (ICP)-emission spectrometric analysis.

(Structure of the Dielectric Particle According the First Embodiment)

In the first embodiment, the dielectric ceramic composition constituting the above mentioned dielectric layer 2 comprises the dielectric particle and the particle boundary, and said dielectric particle comprises the complete solid solution particle wherein the rare earth element R is solid dissolved to the entire dielectric particle. The particle shape and particle diameter of the dielectric particle are not particularly limited.

The complete solid solution particle has a form wherein the rare earth element R is diffused and solid dissolved to said main component. It does not include the phase which is only formed of the main component (usually called as "core"), and it is formed only from the phase wherein the rare earth element R is diffused into the main component (a diffusion phase). Therefore, the form is different from that of so called core-shell particle. Note that sub components other than rare earth element R may be solid dissolved into the main component.

Figure 2:
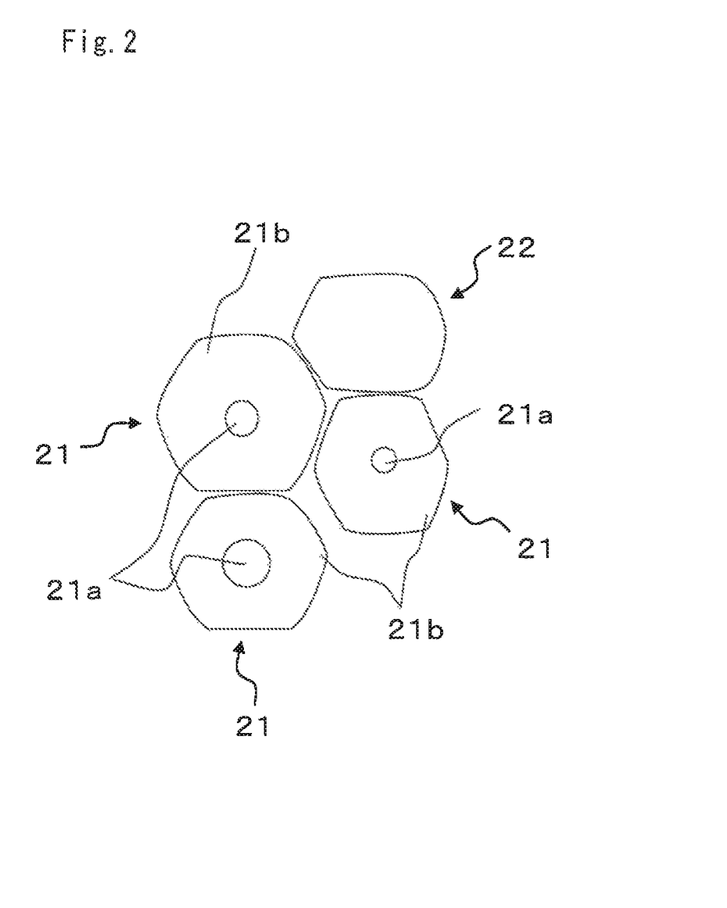
FIG. 2 is the enlarged cross section of the essential part of the dielectric layer shown in FIG. 1.

As shown in FIG. 2 schematically, at the cross section of the dielectric particle having the core-shell structure, the phase substantially consisted only from the main component (the main component phase) can be verified as the core 21a at the center part of the particle. The phase where the rare earth element R is solid dissolved (diffused) to the main component (the diffusion phase) can be verified as the shell 21b around the core. In other words, when the main component phase exists, the diffusion phase including the main component and the rare earth element R is formed at the surrounding area of the main component phase. That is, the dielectric layer is the crystal particle (the core-shell structure particle 21) comprising the core-shell structure which is constituted from the core 21a substantially made of the main component, and the shell 21b present around the core 21a and the rare earth element R diffused to the main component. The core 21a is substantially formed only from the main component, and the shell 21b is formed from the solid dissolved phase wherein the rare earth element R is diffused to the main component. When the diffusion of the rare earth element R into the main component proceeds, the core phase (the main component phase) made of the main component disappears, and will form the dielectric particle entirely (complete solid solution particle) formed only from the diffusion phase (shell).

The dielectric particle of the first embodiment does not have the main component phase (core), and it is the complete solid solution particle 22 which is formed only from the diffusion phase (shell). Note that, in the dielectric layer 2, all of the dielectric particles does not necessarily has to be complete solid solution particles, and the core-shell particle may be included.

In the first embodiment, the ratio of the complete solid solution particle in the dielectric layer 2 is preferably 90% or more, more preferably 95% or more, when the total number of the complete solid solution particles and the core-shell particles is 100%; and the dielectric layer 2 is preferably formed substantially only from the complete solid solution particles.

In the complete solid solution particles, the rare earth element R as the first sub component is solid dissolved in $BaTiO_3$ based main component. When the concentration of the Ti atom in the complete solid solution particle is 100 atom %, then the average concentration Ra of the rare earth element R is 5 to 20 atom %, more preferably 6 to 8 atom %, and particularly preferably 6.5 to 7.5 atom %. Also, in other embodiment, the average concentration Ra of the rare earth element R in the complete solid solution particle is 5 to 6.5 atom %, more preferably 7.5 to 20 atom %.

Further in the complete solid solution particle 22, the rare earth element is dispersed relatively uniformly. That is, in the entire area of the particle, when the rare earth element concentration is measured, the variation thereof is small, and there is no significant difference of the rare earth element concentration at each part of the particle.

The uniformity of the rare earth element concentration can be evaluated for example by measuring the rare earth element concentration (atom %) of the arbitrarily selected 10 measuring points at the area excluding the near area of the particle boundary of the complete solid solution particle, and calculating the ratio between the average value and the standard deviation (standard deviation/average value). The smaller the ratio (standard deviation/average value) is, the more uniform the concentration distribution of the rare earth element is.

Here, the rare earth element concentration (atom %) can be measured by carrying out the area analysis of the rare earth element at the cross section of the dielectric layer 2 using the energy ray dispersive X ray spectrometer (EDS) attached to the transmission electron microscope (TEM). This area analysis is carried out preferably by selecting arbitrary 10 points or more for each measuring particles, and also it is preferable to carry out to 150 or more of the dielectric particles. In the present embodiment, the area (visual field) where 30 or so of the dielectric particles are present is measured for 5 or more visual fields. Then, the characteristic X ray obtained from the analysis is analyzed, thereby the mapping image of the rare earth element R is obtained.

Figure 3:
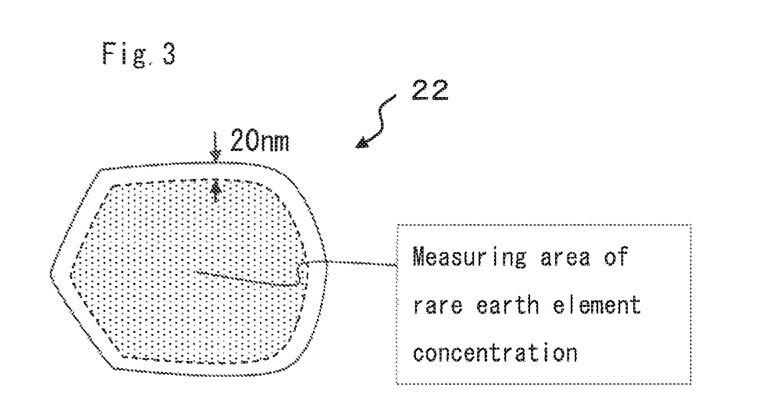
FIG. 3 is the schematic diagram showing the measured points of the parameter (standard deviation/average value) which evaluates the concentration distribution of the rare earth element of the complete solid solution particle.

As shown in FIG. 3, the complete solid solution particle 22 is formed only from the diffusion phase, and the composition thereof (the rare earth element composition) is almost uniform, however in the present embodiment, the measuring points are selected from the part excluding the area 20 nm or less from the particle boundary of the particle.

The complete solid solution particle satisfies (standard deviation/average value)≤0.25, and more preferably satisfies (standard deviation/average value)≤0.10. Note that, the lower limit of (standard deviation/average value) is obviously 0 (zero). Also, in other embodiment, it may be 0.10<(standard deviation/average value)≤0.25.

By constituting the dielectric layer 2 with the complete solid solution particle having small concentration distribution of the rare earth element, the multilayer ceramic capacitor having excellent lifetime characteristic of the insulation resistance can be obtained, even under high electric field intensity.

Second Embodiment

The main component of the dielectric ceramic composition of the second embodiment is a perovskite type compound which is expressed by a compositional formula of $(Ba_{1-x-y}Sr_xCa_y)_m(Ti_{1-z}Zr_z)O_3$. Here "m", "x", "y" and "z" all show mol ratio.

In the compositional formula, "m" shows A/B ratio, and it is 0.94≤m≤1.1, and preferably 0.95≤m<0.99. Also, in other preferable embodiment, "m" may be 0.94≤m≤0.95, and also it may be 0.99≤m≤1.1. If the value "m" of the main component is too small, IR characteristic becomes low due to the over sintering (abnormal crystal growth), and if the value "m" is too large, then the high temperature accelerated lifetime may decline.

In the compositional formula, "x" shows the ratio of Sr in A site, and it is 0≤x≤1.0, preferably 0≤x≤0.2, more preferably 0≤x≤0.1, further preferably 0≤x≤0.01, and it may be 0.

In the compositional formula, "y" shows the ratio of Ca in A site, and it is 0≤y≤1.0, preferably 0≤y≤0.2, more preferably 0≤y≤0.1, further preferably 0≤y≤0.02, and it may be 0.

Also, (x+y) is 0≤(x+y)≤1.0, preferably 0≤(x+y)≤0.4, more preferably 0≤(x+y)≤0.2, further preferably 0≤(x+y)≤0.03, and it may be 0.

In the compositional formula, "z" shows the ratio of Zr in B site, and it is preferably 0.06≤z≤0.2, and preferably 0.1≤z≤0.15. Also, in other preferable embodiment, "z" may be 0.06≤z≤0.1, and it may be 0.15≤z<0.2.

The dielectric ceramic composition comprises the oxides of the rare earth element R as the first sub component. Here, the rare earth element is at least one selected from the group consisting of Sc, Y, La, Ce, Pr, Nd, Pm, Sm, Eu, Gd, Tb, Dy, Ho, Er, Tm, Yb and Lu. Preferably, it is at least one selected from the group consisting of Y, Eu, Gd, Ho and Tb. Note that, two or more of the oxides of the rare earth element can be used together.

The oxides of the rare earth element R is used in the ratio of 10 to 30 mol and preferably 14 to 23 mol with respect to 100 mol of said main component. Also, as other preferable embodiment, it may be 10 to 14 mol, and it may be 23 to 30 mol as well. Note that, the oxides of the rare earth element is usually shown as $R_2O_3$, but the ratio in terms of oxides in the present embodiment is shown as the mol number based on $RO_{3/2}$.

The dielectric ceramic composition further includes the sintering agent as the second sub component. The sintering agent is not particularly limited as long as it contributes to the sintering of the above mentioned main component and the first sub component, however usually the oxides of Si, Li, Al, Ge and B are preferably used. The preferable example and the used amount of the second sub component are as same as the first embodiment.

The dielectric ceramic composition of the present invention may comprise other sub components besides the above mentioned. As the preferable sub components, oxides of Mg as the third sub component, oxides of at least one M selected from the group consisting of Mn, Cr, Co and Fe as the fourth sub component may be mentioned. The preferable example and the used amount of the third and fourth sub components are as same as the first embodiment.

The dielectric ceramic composition according to the present embodiment may further comprise other components depending of the desired characteristics.

(Structure of the Dielectric Particles According to the Second Embodiment)

In the second embodiment, the dielectric ceramic composition constituting the above mentioned dielectric layer 2 comprises the dielectric particle and the particle boundary, and the dielectric particle comprises the main component phase formed from the main component, and the diffusion phase wherein the first sub component is diffused in the first sub component.

Therefore, the dielectric particle of the present embodiment includes the core-shell particle schematically shown in FIG. 2. That is, the dielectric particle is formed from the main component phase (core 21a) which is substantially consisting only of the main component and does not include the sub components, and the phase wherein the rare earth element R is diffused in the main component (the diffusion phase, shell 21b). Note that, the sub component element other than rare earth element R may be solid dissolved in the diffusion phase.

The dielectric particle according to the second embodiment has relatively small area of the main component phase and large diffusion phase at the cross section. In the cross section of the dielectric particle, the area ratio occupied by the diffusion phase is 95% or more, preferably 97% or more, more preferably 98% or more and particularly preferably 99% or more in average with respect to the total area of said main component phase and said diffusion phase. Also, because of the core-shell particle, the area ratio of the diffusion phase is less than 100% and the main component phase (core) exists. Note that, in the dielectric layer 2, all of the dielectric particles does not necessarily needs to be the core-shell particle having 95% or more of the area ratio of the diffusion phase, and the complete solid solution particle may be included, and also the core-shell particle having less than 95% of the area ratio of the diffusion phase may be included.

The area ratio of the diffusion phase in the dielectric particle can be calculated by processing the microscopic image of the cross section of the dielectric layer using the image processing software or so. First, the capacitor element main body 10 is cut at the perpendicular face in the stacking direction of the dielectric layer 2 and the internal electrode layer 3. The chemical etching of the dielectric layer cross section is carried out, then for the arbitrarily selected 200 or more of the dielectric particles, the area of the dielectric particles are calculated. The circle equivalent diameter of this particle is calculated from this area, then the dielectric particle diameter $L_1$ is obtained. Also, an ion milling is carried out, and from the backscattered electron image of the electronic microscope, the core particle diameter $L_2$ is obtained in a similar manner for the area where the rare earth element R is not present (the core). Note that, for the particles of which the core part was not observed, the core particle diameter is considered zero (0). Further, from the obtained dielectric particle diameter $L_1$ and the core particle diameter $L_2$, the area ratio (the shell ratio) of the diffusion phase (shell) occupying the area of the dielectric particle is calculated from the below equation.

Shell ratio (%)=$100\times(1-(L_2^2/L_1^2))$

Also, when the average of the dielectric particle diameter $L_1$ which is calculated from the 200 or more of the dielectric particles constituting the dielectric layer is defined as the average dielectric particle diameter $L_{1ave}$, and the average of the core particle diameter $L_2$ is defined as the average core particle diameter $L_{2ave}$, then the average shell ratio of the dielectric layer is calculated from the below equation.

The average shell ratio (%)=$100\times(1-(L_{2ave}^2/L_{1ave}^2))$

In the dielectric layer of the second embodiment, the average shell ratio is 95% or more, preferably 97% or more, more preferably 98% or more, particularly preferably 99% or more, and because the diffusion phase will always exist, the average shell ratio is less than 100%.

In the dielectric layer 2 according to the second embodiment, the ratio of the core-shell particle having 95% or more and less than 100% of the area ratio of the diffusion phase is preferably 90% or more, and more preferably 95% or more, when the total number of the complete solid solution particle is 100%; and preferably the dielectric layer 2 substantially consist only from the core-shell particle having 95% or more and less than 100% of the area ratio of the diffusion phase.

The diffusion phase is the phase wherein the rare earth element R as the first sub component is solid dissolved to $BaTiO_3$ based main component. When the concentration of Ti atom in the diffusion phase is 100 atom %, then the average concentration Ra of the rare earth element R is 5 to 20 atom %, preferably 5.5 to 9 atom %, and particularly preferably 6.6 to 8.9 atom %. Also, in other embodiment, the average concentration Ra of the rare earth element R in the complete solid solution particle is 5 to 6.6 atom %, and it may also be 8.9 to 20 atom %.

Further, in the diffusion phase, the rare earth element is dispersed relatively uniformly. That is, in the entire area of the diffusion phase, when the rare earth element concentration is measured, the variation thereof is small, and there is no significant difference of the rare earth element concentration at each part of the diffusion phase.

The uniformity of the rare earth element concentration can be evaluated by measuring the rare earth element concentration (atom %) at 10 or more measuring points which are arbitrarily selected at the diffusion phase of the area excluding near area of the particle boundary of the dielectric particle and near the boundary between the diffusion phase and the main component phase, then by obtaining the ratio between the average value thereof and the standard deviation (standard deviation/average).

Here, as described in the first embodiment, the rare earth element concentration (atom %) can be obtained from the mapping image showing the distribution of the rare earth element.

Figure 4:
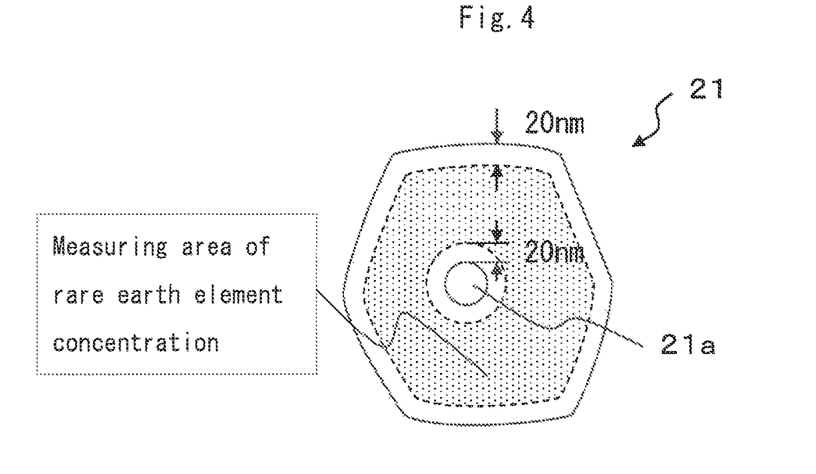
FIG. 4 is the schematic diagram showing the measured points of the parameter (standard deviation/average value) which evaluates the concentration distribution of the rare earth element in the diffusion phase of the core-shell particle.

As shown in FIG. 4, in the core-shell particle 22, the main component phase (core 21a) exists almost at the center of the particle. The diffusion phase (shell 21b) is formed around the main component of the dielectric particle. In the present embodiment, the rare earth element concentration is measured for the diffusion phase (shell 21b) of the dielectric particle 22. Specifically, the measuring points are selected from the diffusion phase excluding the part 20 nm or less from the particle boundary of the dielectric particle, and excluding the part 20 nm or less from the boundary between the main component phase and the diffusion phase.

For the dielectric particle included in the dielectric ceramic composition according to the second embodiment, (standard deviation/average value) satisfies (standard deviation/average value)≤0.25, more preferably (standard deviation/average value)≤0.10. Note that, the lower limit of (standard deviation/average value) is obviously 0 (zero). Also, in the other embodiment, it may be 0.10<(standard deviation/average value)≤0.25. By constituting the dielectric layer 2 with the dielectric particle comprising large area of the diffusion phase having small concentration distribution of the rare earth element, even under high electric field intensity, the multilayer ceramic capacitor with excellent lifetime characteristic of the insulation resistance can be obtained.

In the first and second embodiment, the average particle diameter of the dielectric particle (circle equivalent diameter) is preferably 0.2 to 3.0 μm, and more preferably 0.5 to 1.0 μm.

Internal Electrode Layer 3

The conductive material comprised in the internal electrode layer 3 is not particularly limited, however because the material constituting the dielectric layer 2 is reduction resistant, a relatively inexpensive base metal can be used. As the base metal used as the conductive material, Ni or Ni alloy is preferable. As Ni alloy, the alloy between Ni and an element selected from the group consisting of Mn, Cr, Co and Al is preferable, and preferably the content of Ni in the alloy is 95 wt. % or more. Note that, in Ni or Ni alloy, various trace components such P or so may be included by 0.1 wt. % or less. The thickness of the internal electrode layer 3 may be determined accordingly based on the purpose of use, however preferably it is 0.1 to 3 μm or so.

External Electrode 4

The conductive material comprised in the external electrode 4 is not particularly limited, but inexpensive Ni, Cu and the alloy thereof can be used in the present embodiment. The thickness of the external electrode 4 can be determined appropriately depending on the purpose of use, but usually it is preferably 10 to 50 μm or so.

Production Method of the Multilayer Ceramic Capacitor 1

The multilayer ceramic capacitor 1 of the present embodiment is produced as similar to the conventional multilayer ceramic capacitor, that is the green chip is produced by a printing method or sheet method or so using the paste, then firing this, followed by printing or transferring the external electrode and a firing, thereby the multilayer ceramic capacitor 1 of the present embodiment is produced. Hereinafter, the non-limiting example of the production method will be explained.

First, the dielectric material for forming the dielectric layer is prepared, then this is made into a paste, thereby the dielectric layer paste is prepared.

(Materials)

As the dielectric material, the material of the main component, and the material of each sub components are prepared. As the materials thereof, the oxides of the above mentioned component and the mixture thereof, the composite oxides can be used. Also, it can be selected from various compounds which forms the above mentioned oxides and composite oxides by firing, such as carbonate, oxalate, nitrate, hydroxides, organometal compound or so, and also it can be used by mixing these.

As the material of the main component, those made by various methods such as so called solid phase method and various liquid phase methods (for example, an oxalate method, a hydrothermal synthesis method, an alkoxide method and a sol gel method or so) can be used.

Further, in case components other than the above mentioned main component and the sub components are included in the dielectric layer, as the material of such components, as similar to the above, the oxides of these, the mixture and the composite oxide thereof can be used. Also, in addition, various compounds which become the above mentioned oxides and the composite oxides by firing can be used as well. The content of each component in the dielectric material may be determined so that it satisfies the composition of the above mentioned dielectric ceramic composition after firing.

(Preparation of the Dielectric Material According to the First Embodiment)

In order to obtain the dielectric ceramic composition according to the first embodiment, preferably the above mentioned each material is mixed at once, and this is calcined.

In order to prepare the dielectric material, the material of each component is thoroughly mixed to obtain the mixture powder, then this is heat treated (calcined), and the calcined material is obtained. The mixing of the material is not particularly limited, but it is thoroughly mixed for 20 hours or so by a wet method, then it is dried.

The calcining condition is not particularly limited, however the calcining temperature is 900 to 1350° C., preferably 1000 to 1350° C., the temperature holding time is preferably 1 to 10 hours, the temperature increasing rate up to the calcining temperature is 10° C./hour to 2000° C./hour or so, the temperature decreasing rate after the holding time at the calcining temperature is 200° C./hour or more, preferably 300° C./hour or more, and more preferably 400° C./hour or more.

In order to obtain the complete solid solution particle, the holding time is set relatively long such as 4 hours or longer, and the holding temperature is set higher such as 1100° C. or higher, thereby the diffusion of the rare earth element R and Zr or so are promoted hence the complete solid solution particle can be obtained easily.

Also, by increasing the temperature at slow temperature increasing rate (for example, 10° C./hour or less, preferably 5° C./hour or less, more preferably 2° C./hour or less) in between 100° C. to 200° C. at right before reaching the holding temperature, the rare earth element R and Zr can be diffused uniformly. For example, when the holding temperature is 1100° C., the temperature is increased at relatively fast temperature increasing rate (for example, 200° C./hour) in between the room temperature to 1000° C., then increasing the temperature at the temperature increasing rate 10° C./hour or less, preferably 5° C./hour or less, and more preferably 2° C./hour or less in between 1000° C. to 1100° C.; thereby the dielectric particle having uniform diffusion of the rare earth element in the main component, and having high concentration of the rare earth element and Zr concentration at the diffusion phase can be easily obtained. Although it is not to be limited theoretically in anyway, by slowing the temperature increasing rate before reaching at the holding temperature, the rare earth element and Zr tends to easily incorporated into the main component which is being formed, thus it is thought that the dielectric particle having uniform diffusion of the rare earth element in the main component and having high rare earth element concentration and Zr concentration in the diffusion phase can be obtained.

(Preparation of the Dielectric Material According to the Second Embodiment)

In order to obtain the dielectric ceramic composition according to the second embodiment, preliminary calcination is carried out at relatively low temperature (for example 950° C. to 1050° C.) in advance, then sub components are added and mixed, and further carrying out the second calcination thereby the dielectric material is preferably obtained.

The main component material is thoroughly mixed to obtain the mixed powder, then this is carried out with preliminary heat treatment (preliminary calcination) thereby the preliminary calcination material is obtained. The mixing of the material is not particularly limited, however it is thoroughly mixed for 20 hours or so by a wet mix method, then it is dried.

The preliminary calcination condition is, the calcination temperature of 900 to 1100° C., preferably 950 to 1050° C., the holding time is preferably 1 to 10 hours, the temperature rising rate until the calcination temperature is 10° C./hour to 200° C./hour or so, the temperature decreasing rate after the holding time is 200° C./hour or more, preferably 300° C./hour or more, and more preferably 400° C./hour or more.

The preliminary calcination material is pulverized if needed, and by adding the sub components and further carrying out the second calcination, the dielectric material according to the second embodiment can be obtained. The second calcination temperature is preferably higher than said preliminary calcination temperature, at 900 to 1350° C., and preferably 1000 to 1350° C. By such firing, the main component phase with low crytallinity is formed during the preliminary calcination step, then by carrying out the second calcination together with the sub components, the sub components diffuses to the main component phase which is becoming crystalized, thereby the dielectric material having the core-shell structure tends to be easily obtained.

In order to obtain the dielectric particle having high ratio of the diffusion phase, the holding time at the second calcination is set relatively long such as 4 hours or longer, and the holding temperature is set high such as 1100° C. or higher, thereby the diffusion of the rare earth element R and Zr or so is promoted hence the dielectric particle having high ratio of the diffusion phase can be easily obtained.

Also, by increasing the temperature at slow temperature increasing rate (for example, 10° C./hour or less, preferably 5° C./hour or less, more preferably 2° C./hour or less) in between 100° C. to 200° C. at right before reaching the holding temperature of the second calcination, the diffusion of the rare earth element R can be promoted. For example, when the holding temperature is 1100° C., the temperature is increased at relatively fast temperature increasing rate in between the room temperature to 1000° C., then increasing the temperature at the temperature increasing rate of 10° C./hour or less, preferably 5° C./hour or less, and more preferably 2° C./hour or less in between 1000° C. to 1100° C.; thereby the dielectric particle having uniform diffusion of the rare earth element in the main component and having high rare earth element concentration at the diffusion phase can easily obtained. Although it is not to be limited theoretically in anyway, by slowing the temperature increasing rate right before reaching at the holding temperature, the rare earth element diffuses to the main component which is becoming crystalized, thus the rare earth element is uniformly diffused to the main component, hence it is thought that the core-shell type dielectric particle having high rare earth element concentration at the diffusion phase can be obtained.

If needed, the calcined material obtained as such (the material after the reaction) is pulverized. Then, if needed, the calcined material, the additional main component material and sub component material are mixed, thereby the dielectric material can be obtained. Note that, part of the components evaporates during the calcination, and the composition may change, thus the addition of the components to the calcined material may be determined so that it forms the desired composition after the firing.

(Preparation of the Green Chip)

Next, the dielectric material is made into a paste, then the dielectric paste is prepared. The dielectric layer paste may be an organic paste kneaded with dielectric material and the organic vehicle, or it may be a water-based paste.

The organic vehicle is obtained by dissolving a binder in an organic solvent. The binder used in the organic vehicle is not particularly limited, and may be properly selected from a variety of usual binders such as ethylcellulose and polyvinyl butyral or so. Also, the organic solvent used is not particularly limited, and may be properly selected from a variety of organic solvents such as terpineol, butyl carbitol, acetone and toluene or so in accordance with a method used such as a printing method and a sheet method or so.

Also, when using water-based dielectric layer paste, dielectric materials can be kneaded with a water-based vehicle obtained by dissolving an aqueous binder and a dispersant or so in water. The aqueous binder used for water-based vehicle is not particularly limited, and for example, polyvinyl alcohol, cellulose, aqueous acrylic resin or so may be used.

An internal electrode layer paste is obtained by kneading conductive materials consisting of the above mentioned various conductive metals and alloys, or various oxides, organic metallic compound and resinate or so, which become the above mentioned conductive materials after firing, with the above mentioned organic vehicle. Also, an inhibitor may be included in the internal electrode layer paste. As the inhibitor, it is not particularly limited, but preferably the inhibitor comprises the same composition as the main component.

An external electrode paste may be obtained as same as the above mentioned internal electrode layer paste.

The content of organic vehicle in each of the above mentioned paste is not particularly limited, and may be a usual content, for example, 1 to 5 wt % or so of the binder and 10 to 50 wt % or so of the solvent. Also, in each paste, the additives may be included which are selected from variety of dispersants, plasticizers, dielectrics, insulators or so, if needed. The total contents of these are preferably 10 wt % or less.

When using the printing method, the dielectric layer paste and the internal electrode layer paste are printed on a substrate such as PET or so to form layers, and after cutting to a predetermined shape, the green chip is obtained by removing from the substrate.

Also, when using the sheet method, a green sheet is formed by using the dielectric layer paste, and the internal electrode layer paste is printed thereon, then these are stacked to form the green chip.

(Binder Removal, Firing, and Annealing)

Before firing, the green chip is subjected to a binder removal treatment. The binder removal conditions are, the temperature increasing rate of preferably 5 to 300° C./hour, the holding temperature of preferably 180 to 900° C., and the temperature holding time of preferably 0.5 to 24 hours. Also, the binder removal atmosphere is the air or reduced atmosphere.

After the binder removal, the firing of the green chip is carried out. The atmosphere when firing the green chip can be suitably determined depending on the type of the conductive material in the internal electrode paste. However when using base metal such as Ni or Ni alloy as the conductive material, the oxygen partial pressure of the firing atmosphere is preferably $10^{-14}$ to $10^{-10}$ MPa. If the oxygen partial pressure is below said range, the conductive material of the internal electrode layer may have abnormal sintering which results in a breakage thereof. Also, if the oxygen partial pressure exceeds said range, the internal electrode layer tends to oxidize.

The holding temperature at the firing is preferably 1000 to 1400° C., and more preferably 1100 to 1360° C. If the holding temperature is below said range, the densification becomes insufficient; and if it exceeds said range, the breakage of the electrode tend to occur due to the abnormal sinter of the internal electrode layer, the deterioration of the capacitance-temperature characteristics tend to occur or a reduction of the dielectric ceramic composition tend to occur due to the dispersion of the constitution material of the internal electrode layer.

As for the other firing conditions, the temperature increasing rate is preferably 50 to 2000° C./hour, and more preferably 200 to 300° C./hour; the temperature holding time is preferably 0.5 to 8 hours, and more preferably 1 to 3 hours; and the temperature decreasing rate is preferably 50 to 2000° C./hour, and more preferably 200 to 300° C./hour. Also, the firing atmosphere is preferably a reduced atmosphere. As for the atmospheric gas, for example, wet mixed gas of $N_2$ and $H_2$ may be used.

After firing in a reducing atmosphere, it is preferable to anneal the capacitor element body. The annealing is a treatment for reoxidizing the dielectric layer and can make the lifetime significantly longer, thereby the reliability is improved.

The oxygen partial pressure in the annealing atmosphere is preferably $10^{-9}$ to $10^{-5}$ MPa. When the oxygen partial pressure is below the above range, it may be difficult to reoxidize the dielectric layer. When it exceeds the above range, the internal electrode layer tends to be further oxidized.

The holding temperature at annealing is preferably 1100° C. or less, particularly preferably 500 to 1100° C. When the holding temperature is below the above range, the dielectric layer may not be sufficiently oxidized, which tends to result in low insulation resistance and short high temperature accelerated lifetime. On the other hand, when the holding temperature exceeds the above range, not only the internal electrode layer is oxidized to reduce the capacitance, but also the internal electrode layer reacts with the dielectric element itself, which may tend to cause deteriorated capacitance-temperature characteristics, lowered insulation resistance, and lowered high temperature accelerated lifetime. Note that the annealing may consist of a temperature increasing step and temperature decreasing step. That is, the temperature holding time may be zero. In this case, the holding temperature is as same as the maximum temperature.

Additional annealing conditions include: the temperature holding time of preferably 0 to 20 hours, more preferably 2 to 10 hours; and the temperature decreasing rate of preferably 50 to 500° C./hour, more preferably 100 to 300° C./hour. Also, the atmosphere gas at annealing is preferably $N_2$ or $N_2+H_2O$ gas or so, for example.

Also, the binder removal treatment, the firing and the annealing may be performed continuously or independently.

Thus obtained capacitor element body is then carried out with an end surface polishing, for example, by a barrel polishing or a sand blasting, and the external electrode paste is pasted thereon, followed by firing, then the external electrode 4 is formed. If needed, a covering layer may be formed on the surface of the external electrode 4 by plating or so.

Thus produced multilayer ceramic capacitor of the present embodiment is mounted on the printed-circuit board or so—by soldering or so, to be used in a variety of electronic devices or so.

Hereinabove, an embodiment of the present invention is described, but the present invention is not to be limited to the above-mentioned embodiments and can be variously modified within the scope of the present invention.

For example, in the above-mentioned embodiment, a multilayer ceramic capacitor is exemplified as an electronic component according to the present invention. However, the electronic component according to the present invention is not limited to the multilayer ceramic capacitor and may be any comprising the dielectric layer having the above composition.

As discussed in above, the electronic component according to the present invention has excellent IR characteristic and the high temperature accelerated lifetime, thus it is particularly suited as the multilayer ceramic capacitor for the mid-high voltage having high rated voltage (for example 100 V or higher).

Example

Hereinafter, the present invention will be described based on the further detailed examples, but the present invention is not limited to the examples.

(Preparation of the Dielectric Material According to the First Embodiment)

Samples 1 to 28

As the main component material, barium carbonate ($BaCO_3$), calcium carbonate ($CaCO_3$), strontium carbonate ($SrCO_3$), titanium oxide ($TiO_2$) and zirconium oxide ($ZrO_2$) were prepared. Further, the rare earth oxides as the first sub component material, and oxides of Si and Al as the second sub component material, and magnesium oxide (MgO) as the third sub component and oxides of Mn and Cr as the material of the fourth sub component were prepared.

Said main component and sub components were weighed so that the composition after the firing satisfies the composition shown in Table 1. After weighing each material, these were mixed. The mixing was carried out for 20 hours by a ball mill using wet mix stirring. The compound obtained after the wet mix stirring was dehydrated and dried. After being dehydrated and dried, the temperature was raised to room temperature to 1000° C. at the temperature increasing rate of 200° C./hour, and the temperature was increased at 10° C./hour from 1000° C. to 1100° C., to calcine for 4 hours at 1100° C., then pulverized if necessary, thereby the powder of the calcined materials (the dielectric materials) was obtained.

The samples 23 to 28 had the same material composition but the temperature increasing rate during the calcination was changed. The temperature was increased at the temperature increasing rate of 200° C./hour from room temperature to 1000° C., then from 1000° C. to 1100° C., the temperature was increased at the temperature increasing rate of 2° C./hour (sample 23), 5° C./hour (sample 24), 10° C./hour (sample 25), 50° C./hour (sample 26), 100° C./hour (sample 27), 500° C./hour (sample 28), thereby the powder of the calcination material (the dielectric material) was obtained.

(Preparation of the Dielectric Material According to the Second Embodiment)
Samples 101 to 131

As the main component material, barium carbonate ($BaCO_3$), calcium carbonate ($CaCO_3$), strontium carbonate ($SrCO_3$), titanium oxide ($TiO_2$) and zirconium oxide ($ZrO_2$) were prepared. Said main component was weighed so that the main component composition after the firing satisfies the composition shown in Table 1. Each material was mixed after weighing. The mixing was carried out for 20 hours by a ball mill using wet mix stirring. The compound obtained after the wet mix stirring was dehydrated and dried. After being dehydrated and dried, it was calcined at 1000° C. for 1 hour, then pulverized if necessary, thereby the calcined powder of the main component was obtained.

Further, the rare earth oxides as the first sub component material, and oxides of Si and Al as the second sub component material, and magnesium oxide (MgO) as the third sub component and oxides of Mn and Cr as the material of the fourth sub component were prepared. The calcined powders of said main component and sub components were weighed so that the composition after the firing satisfies the composition shown in Table 2. After weighing each material, these were mixed. The mixing was carried out for 20 hours by a ball mill using wet mix stirring. The compound obtained after the wet mix stirring was dehydrated and dried. After being dehydrated and dried, the temperature was raised from room temperature to 1000° C. at the temperature increasing rate of 200° C./hour, and the temperature was increased at 10° C./hour from 1000° C. to 1100° C., then calcined for 4 hours at 1100° C., and pulverized if necessary, thereby the powder of the calcined materials (the dielectric materials) was obtained.

(Preparation of the Dielectric Layer Paste)

Next, the obtained dielectric material: 100 parts by weight, polyvinyl butyral resin: 10 parts by weight, dioctyl phthalate (DOP) as a plasticizer: 5 parts by weight, and alcohol as a solvent: 100 parts by weight were mixed by a ball mill to form a paste, thereby a dielectric layer paste was obtained.

(Preparation of the Internal Electrode Layer Paste)

Also, aside from the above, Ni particles: 44.6 parts by weight, terpineol: 52 parts by weight, ethyl cellulose: 3 parts by weight and benzotriazole: 0.4 parts by weight were kneaded by triple rolls, thereby an internal electrode layer paste was obtained.

(Preparation of the Green Chip)

Then, by using the above obtained dielectric layer paste, on a PET film, a green sheet was formed so that the thickness after drying was 15 µm. Next, by using the internal electrode layer paste, an electrode layer was printed in a predetermined pattern thereon, followed by removing the sheet from the PET film, thereby the green sheet with the electrode layer was obtained. A plurality of green sheets with the electrode layer were stacked and adhered by pressure to obtain a green multilayer body. The green multilayer body was cut into a predetermined size to obtain a green chip.

(Preparation of the Multilayer Ceramic Capacitor)

Then, the obtained green chip was subjected to the binder removal treatment, the firing and the annealing in the following conditions, to obtain a multilayer ceramic sintered body.

The binder removal treatment was performed under the condition of the temperature increasing rate: 25° C./hour, the holding temperature: 260° C., the temperature holding time: 8 hours, and the atmosphere: in the air.

The firing condition was performed at the temperature rising rate: 200° C./hour, the holding temperature: 1200 to 1300° C., the temperature holding time of 2 hours. The temperature decreasing rate was 200° C./hour. Note that, the atmosphere gas was wet mixed gas of $N_2+H_2$, and the oxygen partial pressure was $10^{-13}$ MPa.

The annealing was performed at the temperature increasing rate: 200° C./hour, the holding temperature: 1050° C., the temperature holding time: 2 hours, the temperature decreasing rate: 200° C./hour, and the atmosphere gas: wet gas of $N_2$ (the oxygen partial pressure: $10^{-6}$ MPa).

Note that a wetter was used to wet the atmosphere gas during the firing and annealing.

After polishing end faces of the obtained sintered body with sandblast, In—Ga alloy was coated as an external electrode to obtain a sample of the multilayer ceramic capacitor shown in FIG. 1. The size of the obtained capacitor sample was 3.2 mm×1.6 mm×0.6 mm, the thickness of the dielectric layer was 10 µm, the thickness of the internal electrode layer was 1.0 µm, and the number of the dielectric layers sandwiched by the internal electrode layers was 5.

The obtained capacitor samples were subjected to the measurements of the area ratio of the diffusion phase, the concentration of the rare earth element R and Zr in the diffusion phase, the insulation resistance (IR) and the high temperature accelerated lifetime (MTTF) of the multilayer ceramic capacitor in accordance with the method shown in below.

Area Ratio of the Diffusion Phase

The area ratio of the diffusion phase in the dielectric particle was calculated by processing the microscopic image of the cross section of the dielectric layer by the image processing software or so. First, the capacitor sample was cut at the perpendicular face in the stacking direction; then this face being cut was subjected to a chemical etching. The cross section was observed under the magnification of 20000×, then the area of the dielectric particles were calculated for arbitrarily selected 200 dielectric particles. The circle equivalent diameter of the particle was calculated from this area, and the average dielectric particle diameter $L_{1ave}$ was obtained. Also, the ion-milling was carried out, and from the backscattered electron image of the electronic microscope, the average core particle diameter $L_{2ave}$ was obtained in a similar manner for the area which does not have the rare earth element R (core). Note that, in case the core part is not observed, the core particle diameter was considered zero (0). Further, from the obtained average dielectric particle diameter $L_{1ave}$ and average core particle diameter $L_{2ave}$, the area ratio (the average shell ratio) of the diffusion phase (shell) occupying the area of the dielectric layer was calculated from the below equation.

$$\text{The average shell ratio (\%)} = 100 \times (1-(L_{2ave}^2/L_{1ave}^2))$$

Concentration Measurement of the Rare Earth Element R in the Diffusion Phase

The area analysis of Ti, the earth element R in the diffusion phase were carried out using the energy ray dispersive X ray spectrometer (EDS) attached to the transmission electron microscope (TEM). This area analysis was carried out to 150 or more of the dielectric particles. The area (visual field) having 30 or more of the dielectric particles was measured for 5 visual fields or more. Then, by analyzing the characteristic X ray obtained from the analysis, the mapping image showing the distribution of Ti, and the rare earth element R was obtained. For each analysis point, the concentration of the rare earth element R when the concentration of the Ti atom is 100 atom % was calculated, then the average concentration Ra of the rare earth element R was obtained.

For the first embodiment, the measurement point was selected from the part excluding the area 20 nm or less of the boundary of the complete solid solution particle. From the average value of the rare earth element concentration and the standard deviation of the measured value for each measuring point, (standard deviation/average value) was calculated, and the concentration distribution of the rare earth element was evaluated.

For the second embodiment, the measurement point was selected from the diffusion phase excluding the part 20 nm or less the particle boundary of the dielectric particle and excluding the part 20 nm or less from the boundary between the main component and the diffusion phase. From the average value of the rare earth element concentration and the standard deviation of the measured value for each measuring point, (standard deviation/average value) was calculated, and the concentration distribution of the rare earth element was evaluated.

Insulation Resistance (IR)

Using an insulation resistance meter (R8340A by Advantest), the insulation resistance IR of the capacitor applying DC voltage of 500V at 25° C. for 10 seconds, then leaving for 50 second after the voltage application was measured. In the present example, $1.0 \times 10^{12} \Omega$ or more was defined good (A), $2.0 \times 10^{12} \Omega$ or more was defined excellent (S), and less than $1.0 \times 10^{12} \Omega$ was defined poor (F).

High Temperature Accelerated Lifetime (MTTF)

The DC voltage was kept applied to the capacitor sample under the electric field of 60V/μm at 200° C., then by measuring the insulation deterioration time of the capacitor sample, the high temperature accelerated lifetime was evaluated. In the present example, the lifetime is defined as the time which took for the insulation resistance to drop by one digit from the start of the voltage application. Also, the above mentioned evaluation was carried out to 10 capacitor samples, then the mean time to failure was calculated by carrying out the weibull analysis, then this mean time to failure was defined as the high temperature accelerated lifetime of the sample. In the present example, 20 hours or longer was defined good (A), 40 hours or longer was defined as excellent (S), and less than 20 hours was defined failure (F).

The results are shown in following Table. In Table 1, "*" mark represents the sample which is out of the range of the claim 1, and the value shown in italicized font shows the value which is out of the range of the claim 1. In Table 2, "*" mark represents the sample which is out of the range of the claim 3, and the value shown in italicized font shows the value which is out of the range of the claim 3. The content of the sub components refers to the content in terms of predetermined oxides. Also, in case plurality of components is used, it is shown alongside, and the content thereof is also shown. For example, (Si, Al) (1.5, 1.7) mean that 1.5 mol of Si oxides and 1.7 mol of Al oxides were used together.

TABLE 1

| | Sample | $(Ba_{1-x-y}Sr_xCa_y)_m(T_{1-z}Zr_z)O_3$ | | | | | First sub component $RO_{3/2}$ [mol %] | | Sintering agent | | Third sub component MgO | | Fourth sub component MO | |
|---|---|---|---|---|---|---|---|---|---|---|---|---|---|---|
| | | m | x | y | z | Element | Total | Element | Content [mol %] | Element | [mol %] | Element | [mol %] |
| ※ | 1 | *0.935* | 0 | 0.01 | 0.10 | Gd | 14 | 14 | Si | 3 | Mg | 6 | Mn | 1.2 |
| | 2 | 0.940 | 0 | 0.01 | 0.10 | Gd | 13 | 13 | Si | 3 | Mg | 5.5 | Mn | 1.35 |
| | 3 | 1.100 | 0 | 0 | 0.13 | Gd | 14 | 14 | Si | 3 | Mg | 5 | Mn | 1.4 |
| ※ | 4 | *1.105* | 0 | 0.03 | 0.11 | Gd | 14 | 14 | Si | 2.9 | Mg | 6 | Mn | 1.2 |
| ※ | 5 | 0.980 | 0.01 | 0.01 | *0.05* | Eu | 12 | 12 | Si | 3.1 | Mg | 4.5 | Mn | 1.1 |
| | 6 | 0.980 | 0 | 0 | 0.06 | Gd | 13 | 13 | Si | 3.1 | Mg | 4.5 | Mn | 1.1 |
| | 7 | 0.980 | 0.03 | 0 | 0.19 | Tb | 13 | 13 | Si | 3.3 | Mg | 6 | Cr | 1.5 |
| ※ | 8 | 0.970 | 0.01 | 0 | *0.20* | Gd | 14 | 14 | Si, Al | 1.5, 1.7 | Mg | 6 | Cr | 1.5 |
| ※ | 9 | 0.980 | 0 | 0 | 0.11 | Gd | 13 | 13 | Si | 3.1 | Mg | 4.5 | Mn | 1.1 |
| | 10 | 0.980 | 0.01 | 0 | 0.13 | Gd | 16 | 16 | Si | 3 | Mg | 6 | Cr | 1.5 |
| | 11 | 0.970 | 0 | 0.01 | 0.12 | Gd | 22 | 22 | Si | 3 | Mg | 4.5 | Mn | 1.1 |
| ※ | 12 | 0.980 | 0 | 0 | 0.13 | Gd | 22 | 22 | Si | 3 | Mg | 6 | Cr | 1.5 |
| | 13 | 0.980 | 0 | 0 | 0.13 | Gd | 14 | 14 | Si, Al | 1.5, 1.7 | Mg | 4.5 | Mn | 1.1 |
| | 14 | 0.980 | 0 | 0 | 0.13 | Gd | 14 | 14 | Si | 3.3 | Mg | 6 | Cr | 1.5 |
| | 15 | 0.970 | 0.01 | 0 | 0.13 | Tb | 13 | 13 | Si | 3.1 | Mg | 6 | Cr | 1.5 |
| | 16 | 0.970 | 0.01 | 0.01 | 0.12 | Gd | 12 | 12 | Si | 3.1 | Mg | 4.5 | Mn | 1.1 |
| | 17 | 0.980 | 0 | 0 | 0.11 | Gd, Eu | 10, 5 | 15 | Si | 3.1 | Mg | 4.5 | Mn | 1.1 |
| ※ | 18 | 0.980 | 0 | 0 | 0.13 | Gd | 15 | 15 | Si | 3.3 | Mg | 6 | Cr | 1.5 |
| ※ | 19 | 0.970 | 0.01 | 0 | 0.12 | Gd | 15 | 15 | Si | 3.1 | Mg | 6 | Cr | 1.5 |
| | 20 | 0.970 | 0 | 0.01 | 0.11 | Gd | 15 | 15 | Si | 3.6 | Mg | 5 | Mn | 1.1 |
| | 21 | 0.985 | 0.01 | 0 | 0.10 | Gd, Y | 10, 4 | 14 | Si, Al | 1.5, 1.5 | Mg | 4.5 | Mn | 1.1 |
| | 22 | 0.980 | 0 | 0 | 0.11 | Gd | 15 | 15 | Si | 2.6 | Mg | 8 | Mn | 1.2 |
| | 23 | 0.990 | 0 | 0 | 0.110 | Gd | 14 | 14 | Si | 3.3 | Mg | 5 | Mn | 1.1 |
| | 24 | 0.990 | 0 | 0 | 0.110 | Gd | 14 | 14 | Si | 3.3 | Mg | 5 | Mn | 1.1 |
| | 25 | 0.990 | 0 | 0 | 0.110 | Gd | 14 | 14 | Si | 3.3 | Mg | 5 | Mn | 1.1 |
| ※ | 26 | 0.990 | 0 | 0 | 0.110 | Gd | 14 | 14 | Si | 3.3 | Mg | 5 | Mn | 1.1 |
| ※ | 27 | 0.990 | 0 | 0 | 0.110 | Gd | 14 | 14 | Si | 3.3 | Mg | 5 | Mn | 1.1 |
| ※ | 28 | 0.990 | 0 | 0 | 0.110 | Gd | 14 | 14 | Si | 3.3 | Mg | 5 | Mn | 1.1 |

TABLE 1-continued

| | Sample | Area ratio of diffusion phase % | Rare earth element concentration in diffusion phase | | | [R[Ω]] 500 V, 1 min | | High temperature accelerated lifetime (MTTF)[h] 200° C., 60 V/um | |
|---|---|---|---|---|---|---|---|---|---|
| | | | Average value [at %] | Standard deviation | Standard deviation/ Average value | | Evaluation | | Evaluation |
| ※ | 1 | 100.0 | 7.4 | 1.5 | 0.203 | 9.5E+09 | F | unable to measure | F |
| | 2 | 100.0 | 6.6 | 1.4 | 0.212 | 1.1E+12 | A | 48.2 | S |
| | 3 | 100.0 | 6.5 | 1.4 | 0.215 | 1.9E+12 | A | 20.5 | A |
| ※ | 4 | 100.0 | 7.4 | 1.6 | 0.216 | 2.6E+12 | S | 8.9 | F |
| ※ | 5 | 100.0 | 7.2 | 1.3 | 0.181 | 8.9E+11 | F | 55.5 | S |
| | 6 | 100.0 | 7.2 | 1.5 | 0.208 | 1.1E+12 | A | 49.1 | S |
| | 7 | 100.0 | 7.0 | 1.2 | 0.171 | 1.9E+12 | A | 21.1 | A |
| ※ | 8 | 100.0 | 7.3 | 1.3 | 0.178 | 2.8E+12 | S | 17.7 | F |
| ※ | 9 | 100.0 | *4.9* | 0.8 | 0.163 | 2.2E+12 | S | 15.3 | F |
| | 10 | 100.0 | 5.0 | 1.0 | 0.200 | 1.9E+12 | A | 20.4 | A |
| | 11 | 100.0 | 20.0 | 2.7 | 0.135 | 1.1E+12 | A | 49.6 | S |
| ※ | 12 | 100.0 | *21.0* | 3.0 | 0.143 | 7.5E+11 | F | 57.3 | S |
| | 13 | 100.0 | 7.2 | 0.8 | 0.111 | 1.9E+12 | A | 48.9 | S |
| | 14 | 100.0 | 7.0 | 0.9 | 0.129 | 1.9E+12 | A | 43.1 | S |
| | 15 | 100.0 | 7.3 | 1.1 | 0.151 | 1.9E+12 | A | 35.5 | A |
| | 16 | 100.0 | 7.2 | 1.5 | 0.208 | 1.8E+12 | A | 27.1 | A |
| | 17 | 100.0 | 7.2 | 1.8 | 0.250 | 1.8E+12 | A | 20.3 | A |
| ※ | 18 | 100.0 | 7.0 | 1.8 | *0.257* | 1.7E+12 | A | 16.4 | F |
| ※ | 19 | 100.0 | 7.3 | 2.0 | *0.274* | 1.5E+12 | A | 3.2 | F |
| | 20 | 100.0 | 7.5 | 0.4 | 0.053 | 2.0E+12 | S | 57.8 | S |
| | 21 | 100.0 | 6.6 | 0.4 | 0.061 | 1.9E+12 | A | 53.5 | S |
| | 22 | 100.0 | 7.0 | 0.5 | 0.071 | 2.0E+12 | S | 53.3 | S |
| | 23 | 100.0 | 10.0 | 1.0 | 0.100 | 2.2E+12 | S | 56.6 | S |
| | 24 | 100.0 | 9.5 | 1.1 | 0.116 | 2.2E+12 | S | 48.8 | S |
| | 25 | 100.0 | 7.3 | 1.0 | 0.137 | 2.1E+12 | S | 32.2 | A |
| ※ | 26 | 100.0 | 6.2 | 1.6 | *0.258* | 1.9E+12 | A | 18 | F |
| ※ | 27 | 100.0 | 6.0 | 1.6 | *0.267* | 1.7E+12 | A | 15.5 | F |
| ※ | 28 | 100.0 | *4.0* | 1.3 | *0.325* | 1.6E+12 | A | 10.3 | F |

TABLE 2

| | Sample | $(Ba_{1-x-y}Sr_xCa_y)_m(T_{1-z}Zr_z)O_3$ | | | | First sub component $RO_{3/2}$ [mol %] | | | Sintering agent | | Third sub component MgO | | Fourth sub component MO | |
|---|---|---|---|---|---|---|---|---|---|---|---|---|---|---|
| | | m | x | y | z | Element | | Total | Content Element | [mol %] | Element | [mol %] | Element | [mol %] |
| ※ | 101 | *0.935* | 0 | 0.01 | 0.13 | Ho | 15 | 15 | Si | 3 | Mg | 6 | Mn | 1.2 |
| | 102 | 0.940 | 0 | 0 | 0.10 | Eu | 14 | 14 | Si | 3 | Mg | 5.5 | Mn | 1.35 |
| | 103 | 1.100 | 0 | 0.01 | 0.02 | Tb | 14 | 14 | Si, Al | 1.5, 1.7 | Mg | 5 | Mn | 1.4 |
| ※ | 104 | *1.105* | 0 | 0.03 | 0.13 | Gd | 15 | 15 | Si | 2.9 | Mg | 6 | Mn | 1.2 |
| ※ | 105 | 0.985 | 0 | 0.01 | *0.05* | Eu | 15 | 15 | Si | 3.1 | Mg | 4.5 | Mn | 1.1 |
| | 106 | 0.980 | 0 | 0 | 0.06 | Gd | 15 | 15 | Si | 3.1 | Mg | 4.5 | Mn | 1.1 |
| | 107 | 0.980 | 0 | 0 | 0.19 | Gd | 16 | 16 | Si | 3 | Mg | 6 | Cr | 1.5 |
| ※ | 108 | 0.970 | 0 | 0.01 | *0.20* | Gd | 16 | 16 | Si | 2.8 | Mg | 6 | Cr | 1.5 |
| ※ | 109 | 1.000 | 0.02 | 0 | 0.11 | Gd | 18 | 18 | Si | 3.1 | Mg | 4 | Mn | 1.2 |
| | 110 | 0.990 | 0.01 | 0.01 | 0.11 | Tb | 15 | 15 | Si | 2.9 | Mg | 4 | Mn | 1.1 |
| ※ | 111 | 0.980 | 0 | 0 | 0.11 | Gd | 14 | 14 | Si | 3.1 | Mg | 4.5 | Mn | 1.1 |
| | 112 | 0.980 | 0.01 | 0 | 0.13 | Gd | 16 | 16 | Si | 3 | Mg | 6 | Cr | 1.5 |
| | 113 | 0.970 | 0 | 0.01 | 0.12 | Gd | 23 | 23 | Si | 3 | Mg | 4.5 | Mn | 1.1 |
| ※ | 114 | 0.980 | 0 | 0 | 0.13 | Gd | 23 | 23 | Si | 3 | Mg | 6 | Cr | 1.5 |
| | 115 | 0.980 | 0 | 0 | 0.13 | Gd, Y | 10, 5 | 15 | Si, Al | 1.5, 1.7 | Mg | 4.5 | Mn | 1.1 |
| | 116 | 0.980 | 0 | 0 | 0.13 | Gd | 14 | 14 | Si | 3.3 | Mg | 6 | Cr | 1.5 |
| | 117 | 0.970 | 0.01 | 0 | 0.13 | Tb | 14 | 14 | Si | 3.1 | Mg | 6 | Cr | 1.5 |
| | 118 | 0.970 | 0.01 | 0.01 | 0.12 | Gd | 15 | 15 | Si | 3.1 | Mg | 4.5 | Mn | 1.1 |
| | 119 | 0.980 | 0 | 0 | 0.11 | Eu | 15 | 15 | Si | 3.1 | Mg | 4.5 | Mn | 1.1 |
| ※ | 120 | 0.980 | 0 | 0 | 0.13 | Gd | 15 | 15 | Si | 3.3 | Mg | 6 | Cr | 1.5 |
| ※ | 121 | 0.970 | 0.01 | 0 | 0.12 | Gd | 15 | 15 | Si | 3.1 | Mg | 6 | Cr | 1.5 |
| | 122 | 0.990 | 0 | 0 | 0.12 | Gd | 15 | 15 | Si | 3.1 | Mg | 5 | Mn | 1.1 |
| | 123 | 0.980 | 0 | 0.01 | 0.11 | Tb | 15 | 15 | Si | 3.6 | Mg | 4 | Mn | 1 |
| | 124 | 0.990 | 0 | 0 | 0.11 | Gd | 14 | 14 | Si | 3.3 | Mg | 5 | Mn | 1.1 |
| | 125 | 1.000 | 0 | 0 | 0.12 | Gd | 14 | 14 | Si | 3 | Mg | 5 | Mn | 1.1 |
| | 126 | 0.990 | 0.01 | 0.01 | 0.11 | Tb | 15 | 15 | Si | 3 | Mg | 4 | Mn | 1 |
| | 127 | 0.990 | 0 | 0 | 0.12 | Gd, Y | 10, 5 | 15 | Si | 3.3 | Mg | 5 | Mn | 1 |
| | 128 | 0.970 | 0 | 0.01 | 0.11 | Gd | 15 | 15 | Si | 3.6 | Mg | 5 | Mn | 1.1 |

TABLE 2-continued

| | | | | | | | | | | | | |
|---|---|---|---|---|---|---|---|---|---|---|---|---|
| 129 | 0.985 | 0.01 | 0 | 0.10 | Gd, Y | 10, 4 | 14 | Si, Al | 1.5, 1.5 | Mg | 4.5 | Mn | 1.1 |
| 130 | 0.980 | 0 | 0 | 0.11 | Gd | 15 | 15 | Si | 2.6 | Mg | 8 | Mn | 1.2 |
| 131 | 0.980 | 0.11 | 0 | 0.13 | Gd | 14 | 14 | Si | 3 | Mg | 4.5 | Mn | 1.1 |

| | Area ratio of diffusion phase | Rare earth element concentration in diffusion phase | | | [R[Ω]] 500 V, 1 min | | High temperature accelerated lifetime (MTTF)[h] 200° C., 60 V/μm | |
|---|---|---|---|---|---|---|---|---|
| | | Average value | Standard | Standard deviation/ | | | | |
| Sample | % | [at %] | deviation | Average value | | Evaluation | | Evaluation |
| ✕ 101 | 96.7 | 8.2 | 1.4 | 0.171 | 7.7E+09 | F | unable to measure | F |
| 102 | 97.2 | 8.1 | 1.3 | 0.160 | 1.1E+12 | A | 39.9 | A |
| 103 | 96.6 | 7.0 | 1.3 | 0.186 | 1.9E+12 | A | 21.5 | A |
| ✕ 104 | 96.5 | 5.5 | 0.9 | 0.164 | 2.2E+12 | S | 10.3 | F |
| ✕ 105 | 96.5 | 7.3 | 1.5 | 0.205 | 4.4E+11 | F | 41.3 | S |
| 106 | 97.3 | 6.6 | 1.3 | 0.197 | 1.1E+12 | A | 39.0 | A |
| 107 | 95.8 | 5.8 | 1.1 | 0.190 | 1.9E+12 | A | 20.1 | A |
| ✕ 108 | 95.8 | 6.2 | 1.2 | 0.194 | 2.1E+12 | S | 16.3 | F |
| ✕ 109 | *94.8* | 7.7 | 1.4 | 0.182 | 1.3E+12 | A | 18.2 | F |
| 110 | 95.0 | 8.9 | 1.4 | 0.158 | 1.4E+12 | A | 21.1 | A |
| ✕ 111 | 96.6 | *4.9* | 0.8 | 0.163 | 2.0E+12 | S | 18.1 | F |
| 112 | 97.5 | 5.0 | 0.9 | 0.180 | 1.9E+12 | A | 20.1 | A |
| 113 | 96.5 | 20.0 | 1.8 | 0.090 | 1.1E+12 | A | 38.2 | A |
| ✕ 114 | 96.7 | *21.0* | 1.8 | 0.086 | 8.8E+11 | F | 39.0 | A |
| 115 | 97.3 | 7.5 | 1.4 | 0.187 | 1.9E+12 | A | 39.2 | A |
| 116 | 97.5 | 8.5 | 1.4 | 0.165 | 1.8E+12 | A | 35.0 | A |
| 117 | 97.5 | 8.0 | 1.3 | 0.163 | 1.9E+12 | A | 30.3 | A |
| 118 | 96.8 | 7.9 | 1.5 | 0.190 | 1.9E+12 | A | 26.5 | A |
| 119 | 97.1 | 7.9 | 1.4 | 0.177 | 1.8E+12 | A | 20.1 | A |
| ✕ 120 | 97.1 | 8.7 | 2.2 | *0.253* | 1.9E+12 | A | 18.9 | F |
| ✕ 121 | 97.0 | 8.5 | 2.4 | *0.282* | 1.7E+12 | A | 14.4 | F |
| 122 | 98.8 | 7.2 | 0.8 | 0.112 | 1.5E+12 | A | 47.7 | S |
| 123 | 98.6 | 7.7 | 0.9 | 0.117 | 1.6E+12 | A | 44.4 | S |
| 124 | 98.3 | 8.1 | 1.1 | 0.136 | 1.7E+12 | A | 41.1 | S |
| 125 | 98.0 | 7.5 | 1.4 | 0.187 | 1.5E+12 | A | 40.3 | S |
| 126 | 97.7 | 7.2 | 1.4 | 0.194 | 1.6E+12 | A | 35.2 | A |
| 127 | 96.8 | 6.8 | 1.7 | 0.250 | 1.4E+12 | A | 27.5 | A |
| 128 | 98.6 | 7.7 | 0.5 | 0.065 | 2.0E+12 | S | 55.5 | S |
| 129 | 98.8 | 6.6 | 0.5 | 0.076 | 1.9E+12 | A | 54.3 | S |
| 130 | 98.4 | 7.0 | 0.7 | 0.100 | 2.0E+12 | S | 51.1 | S |
| 131 | 98.1 | 6.8 | 0.8 | 0.118 | 1.9E+12 | A | 45.3 | S |

According to the samples 1 to 4 and 101 to 104, when the value "m" of the main component is small, IR characteristic is lowered due to the over sintering (abnormal particle growth), on the other hand, if the value "m" is large, the sub components does not solid dissolve hence the high temperature accelerated lifetime is low.

According to the samples 5 to 8 and 105 to 108, by substituting Ti site with Zr ($BaTiO_3 \rightarrow BaTi_{1-z}Zr_zO_3$), the bandgap becomes high, thereby the resistance can be increased. On the other hand, if Zr is too much, the solid dissolving of the rare earth element to the main component is interfered, hence the high temperature accelerated lifetime declines.

According to the samples 9 and 111, it can be understood that when the rare earth element concentration is too low at the diffusion phase, then sufficient high temperature accelerated lifetime cannot be obtained. On the other hand, according to the samples 12 and 114, it can be understood that when the rare earth element concentration is too high at the diffusion phase, then sufficient IR characteristic cannot be obtained.

According to the samples 18, 19, 26 to 28, 120 and 121, the concentration distribution of the rare earth element at the diffusion phase can be non-uniform, thus sufficient high temperature accelerated lifetime cannot be obtained; and according the samples 12 to 17, 115 to 119, it can be understood that as the concentration distribution of the rare earth element becomes uniform, the high temperature accelerated lifetime improves.

According to these results, it can be understood that by uniformly dispersing the rare earth element in a certain range of the diffusion phase, high IR characteristic and excellent high temperature accelerated lifetime can both be attained.

NUMERICAL REFERENCES

1 . . . Multilayer ceramic capacitor
2 . . . Dielectric layer
21 . . . Core-shell structure particle
22 . . . Complete solid solution particle
3 . . . Internal electrode layer
4 . . . External electrode layer
10 . . . Capacitor element body

The invention claimed is:
1. A dielectric ceramic composition comprising,
a main component comprising a perovskite type compound shown by a compositional formula ($Ba_{1-x-y}Sr_xCa_y)_m(Ti_{1-z}Zr_z)O_3$, where said "m", "x", "y" and "z" all represent a mol ratio, and each satisfies:
0.94<m<1.1,
0<x<1.0,

$0<y<1.0$,
$0<(x+y)<1.0$,
$0.06<z<0.2$,
a first sub component comprising oxides of a rare earth element R, the rare earth element R being is at least one selected from the group consisting of Sc, Y, La, Ce, Pr, Nd, Pm, Sm, Eu, Gd, Tb, Dy, Ho, Er, Tm, Yb and Lu, and
a second sub component as a sintering agent, wherein
said dielectric ceramic composition comprises a dielectric particle and a particle boundary,
said dielectric particle comprises a complete solid solution particle wherein the rare earth element R is solid dissolved to entire dielectric particle,
when a concentration of Ti atom in said complete solid solution particle is 100 atom %, then an average concentration Ra of the rare earth element R in said complete solid solution particle is 5 to 20 atom %, and
when the rare earth element concentration (atom %) is measured at a part excluding an area 20 nm or less from the particle boundary of said complete solid solution particle, then a standard deviation and an average value of a measured values satisfies (standard deviation/average value)<0.25.

2. The dielectric ceramic composition as set forth in claim 1, wherein said (standard deviation/average value) satisfies (standard deviation/average value)<0.10.

3. A dielectric ceramic composition comprising,
a main component comprising a perovskite type compound shown by a compositional formula $(Ba_{1-x-y}Sr_xCa_y)_m(Ti_{1-z}Zr_z)O_3$, where said "m", "x", "y" and "z" all show represent a mol ratio, and each satisfies:
$0.94<m<1.1$,
$0<x<1.0$,
$0<y<1.0$,
$0<(x+y)<1.0$,
$0.06<z<0.2$,
a first sub component comprising oxides of a rare earth element R, the rare earth element R being at least one selected from the group consisting of Sc, Y, La, Ce, Pr, Nd, Pm, Sm, Eu, Gd, Tb, Dy, Ho, Er, Tm, Yb and Lu, and
a second sub component as a sintering agent, wherein
said dielectric ceramic composition comprises a dielectric particle and a particle boundary,
said dielectric particles comprises a main component phase made of said main component, and a diffusion phase wherein said first sub component is diffused in said main component,
a ratio of area occupied by said diffusion phase is 95% or more and less than 100% in average with respect to a total area of said main component phase and said diffusion phase,
when a concentration of Ti atom in said diffusion phase is 100 atom %, then an average concentration Ra of the rare earth element R in the diffusion phase is 5 to 20 atom %, and
when the rare earth element concentration (atom %) is measured at a part excluding an area 20 nm or less from the particle boundary of said complete solid solution particle and at the diffusion phase excluding the area 20 nm or less from the boundary between the main component phase and the diffusion phase, then a standard deviation and an average value of a measured values satisfies (standard deviation/average value)<0.25.

4. The dielectric ceramic composition as set forth in claim 3, wherein said (standard deviation/average value) satisfies (standard deviation/average value)<0.10.

5. The dielectric ceramic composition as set forth in claim 3, the ratio of area occupied by said diffusion phase is 98% or more and less than 100% in average with respect to the total area of said main component phase and said diffusion phase.

6. The dielectric ceramic composition as set forth in claim 4, the ratio of area occupied by said diffusion phase is 98% or more and less than 100% in average with respect to the total area of said main component phase and said diffusion phase.

7. An electronic component including the dielectric ceramic composition as set forth in claim 1.

8. A multilayer ceramic capacitor comprising a dielectric layer including the dielectric ceramic composition as set forth in claim 1, and an internal electrode layer.

* * * * *